No. 816,102. PATENTED MAR. 27, 1906.
J. D. KITTRELL.
ANIMAL TRAP.
APPLICATION FILED DEC. 19, 1905.
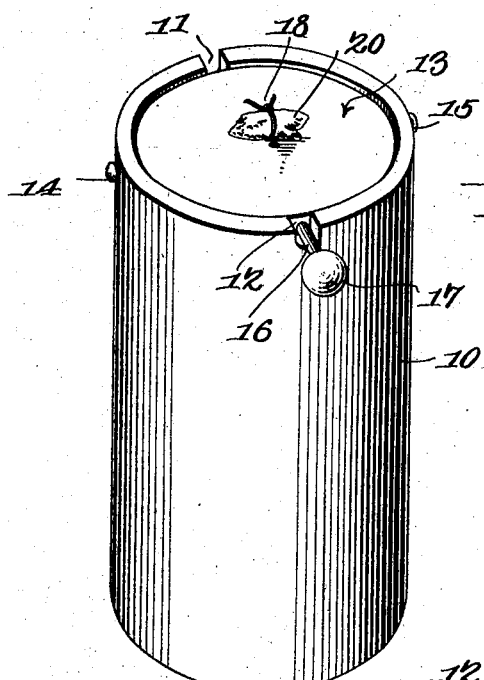
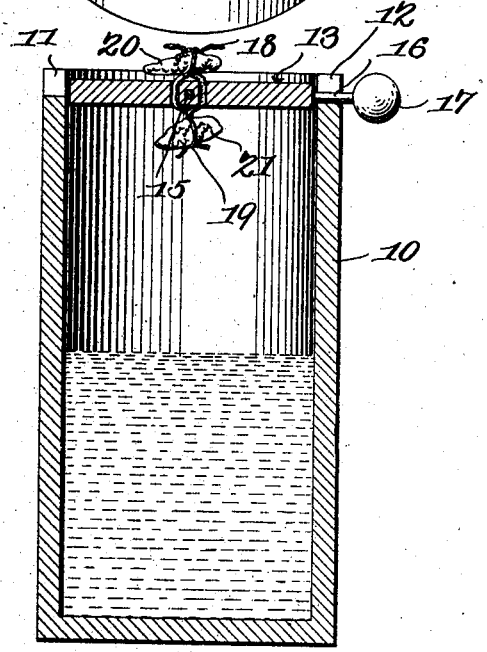
WITNESSES:
James D. Kittrell,
INVENTOR.
By C. A. Snow & Co.
ATTORNEYS

UNITED STATES PATENT OFFICE.

JAMES D. KITTRELL, OF HOPE, ARKANSAS.

ANIMAL-TRAP.

No. 816,102.  Specification of Letters Patent.  Patented March 27, 1906.

Application filed December 19, 1905. Serial No. 292,484.

*To all whom it may concern:*

Be it known that I, JAMES D. KITTRELL, a citizen of the United States, residing at Hope, in the county of Hempstead and State of Arkansas, have invented a new and useful Animal-Trap, of which the following is a specification.

This invention relates to animal-traps, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claim.

In the drawings, Figure 1 is a perspective view of the improved trap. Fig. 2 is a longitudinal sectional view of the same.

The improved device comprises a receptacle of any desired form or size, preferably adapted to hold liquid in which the trapped animals are to be drowned.

For the purpose of illustration a circular receiver is shown at 10 with the upper end open and notches 11 12 in the upper edge at opposite sides. Mounted to swing in the upper open end of the receptacle 10 is a trip-plate 13, the pivots 14 15 of the plate disposed intermediate the notches 11 12. Extending from the plate 13 is an arm 16, adapted to alternately engage the notches 11 12 as the plate swings upon its pivots, and thus prevent it from making a complete revolution upon the pivots. The arm 16 is provided with a weight 17, operating to maintain the trip-plate yieldably in either one of its two positions, and also preventing the plate from becoming poised in open position.

Means are provided at 18 19 for the attachment of bait 20 21 upon each side of the trip-plate, so that the trap will be "baited" no matter which side of the plate is uppermost.

With a device thus arranged any attempt of the animal to reach the bait will cause the plate 13 to be tilted by its weight and precipitate the animal into the water in the receptacle, the plate automatically returning to its former position or to a reversed position, ready for the next animal. If the movement of the plate is not sufficient to raise the arm 16 and its weight 17 past the center, the plate will be returned to its former position; but if the plate be moved far enough to throw the arm and weight past the center the plate will be reversed in position by the gravity of the weighted arm, as will be obvious. In any event the two portions of bait render the trap operative no matter which side of the plate is uppermost.

The parts may be of any required material and of any size to adapt it to different species of animals and can be inexpensively manufactured and operates effectually for the purpose described.

The improved trap will be located in position to enable the animals to readily reach the bait and trip closure or plate and may be partly concealed or located contiguous to other objects to enable the trip-plate to be more readily reached.

Having thus described the invention, what is claimed is—

An animal-trap comprising a receiver for the animals and open at the upper end, a trip-plate swinging centrally in said open end, means for attaching bait to the opposite sides of said plate, a stop-arm extending from one side of said plate and adapted to alternately engage the receiver at opposite sides to limit the movement of the plate, and a weight connected to said arm.

In testimony that I claim the foregoing as my own I have hereto affixed my signature in the presence of two witnesses.

JAMES D. KITTRELL.

Witnesses:
 DORSEY McRAE,
 J. H. BLACK.